(12) United States Patent
Yellowhair

(10) Patent No.: US 11,914,374 B1
(45) Date of Patent: Feb. 27, 2024

(54) SOLAR MIRROR SOILING AND HELIOSTAT INSPECTION FROM A MOBILE IMAGING SYSTEM AND MOBILE PLATFORM

(71) Applicant: National Technology & Engineering Solutions of Sandia, LLC, Albuquerque, NM (US)

(72) Inventor: Julius Yellowhair, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 440 days.

(21) Appl. No.: 17/065,183

(22) Filed: Oct. 7, 2020

(51) Int. Cl.
*G05D 1/00* (2006.01)
*F24S 23/74* (2018.01)
*B64C 39/02* (2023.01)
*B64U 101/30* (2023.01)

(52) U.S. Cl.
CPC ......... *G05D 1/0094* (2013.01); *B64C 39/024* (2013.01); *F24S 23/74* (2018.05); *G05D 1/101* (2013.01); *B64U 2101/30* (2023.01)

(58) Field of Classification Search
CPC .... G05D 1/0094; G05D 1/101; B64C 39/024; F24S 23/74; B64U 2101/30
USPC .......................................................... 382/152
See application file for complete search history.

(56) References Cited

U.S. PATENT DOCUMENTS

| 8,582,092 B1 | 11/2013 | Yellowhair et al. | |
| 2008/0236568 A1* | 10/2008 | Hickerson | F24S 30/452 126/578 |
| 2011/0146663 A1* | 6/2011 | Ezawa | G02B 19/0019 126/714 |

FOREIGN PATENT DOCUMENTS

| KR | 20190140175 | * 12/2019 | G01S 13/90 |
| WO | WO-2014025823 A1 | * 2/2014 | F24J 2/07 |

* cited by examiner

*Primary Examiner* — Jerome Grant, II
(74) *Attorney, Agent, or Firm* — Daniel J. Jenkins

(57) ABSTRACT

A system or method for an imaging system is provided for inspecting a heliostat. The imaging system includes a platform and a camera mounted on the platform and a heliostat having a plurality of mirrored facets. The camera is positioned to acquire a first image that serves as a reference image and a second image that is a reflected image from at least one facet. The camera stores image data associated with the first image and the second image, and wirelessly transmits the stored image data to a computing apparatus. The computing apparatus compares the first image with the second image and determines a performance parameter associated with the heliostat.

17 Claims, 4 Drawing Sheets

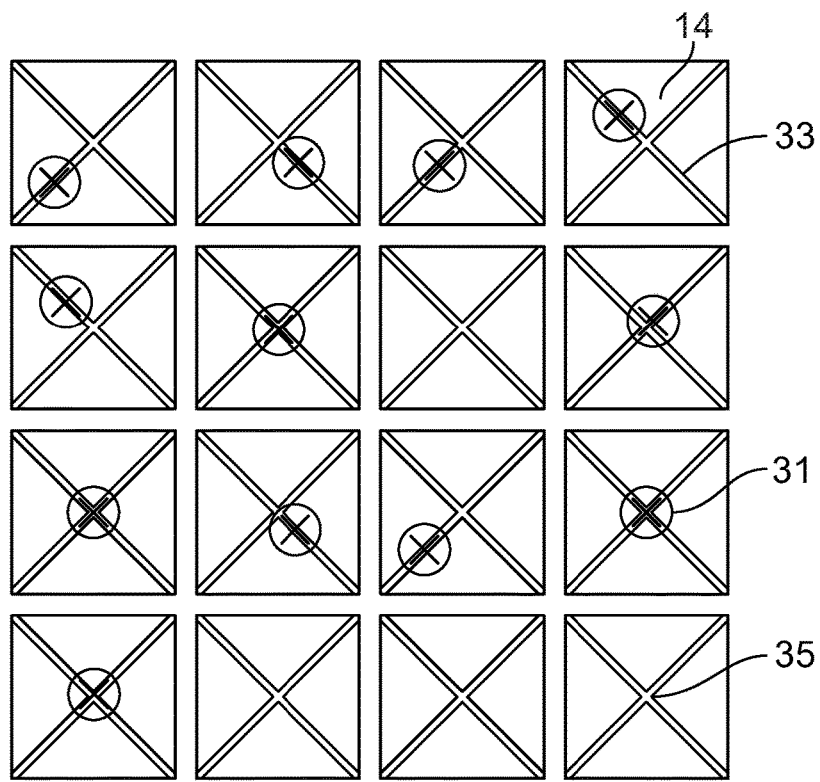
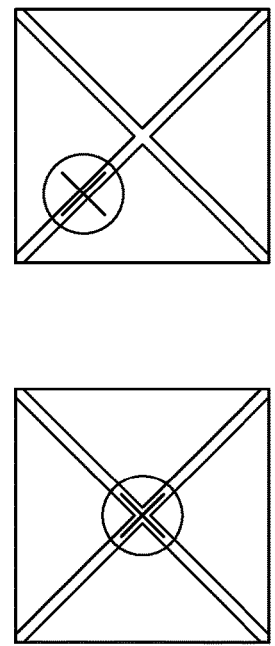
FIG. 3A   FIG. 3B
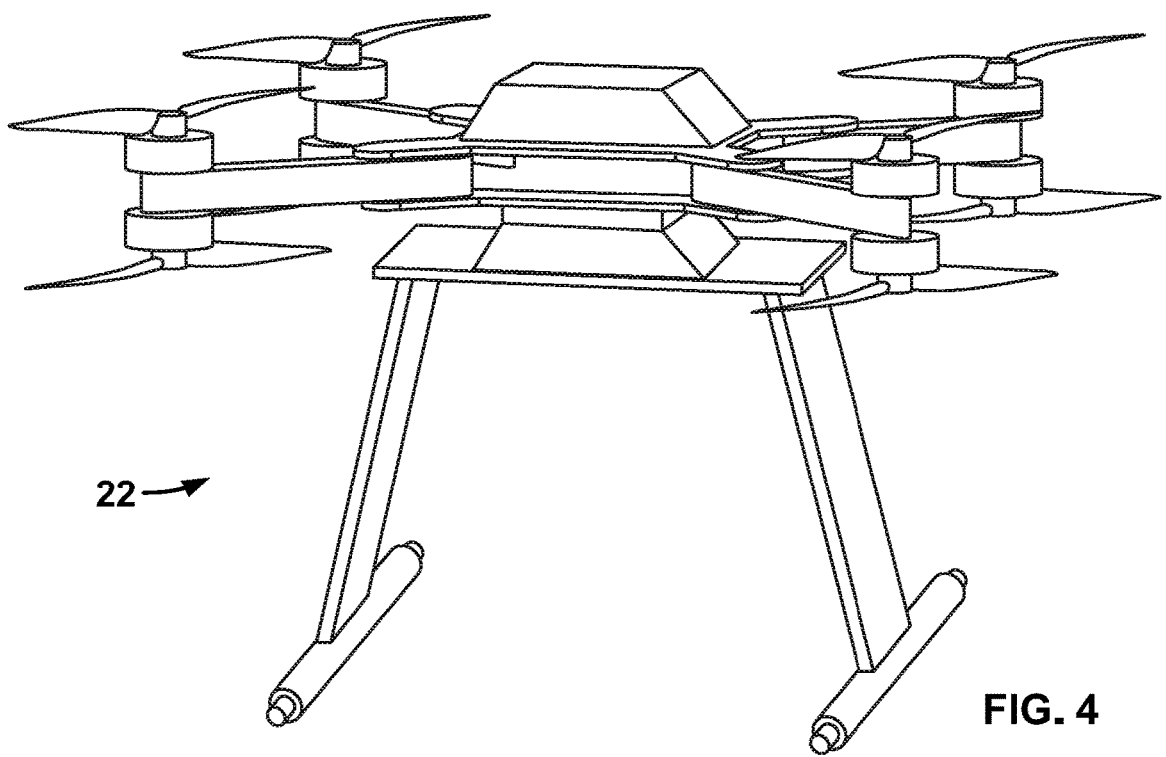
FIG. 4

SOLAR MIRROR SOILING AND HELIOSTAT INSPECTION FROM A MOBILE IMAGING SYSTEM AND MOBILE PLATFORM

STATEMENT REGARDING FEDERALLY SPONSORED RESEARCH OR DEVELOPMENT

This invention was developed under Contract No. DE-NA0003525 awarded by the United States Department of Energy/National Nuclear Security Administration. The Government has certain rights in this invention.

BACKGROUND OF THE INVENTION

The application generally relates to heliostat fields for solar power generation. The application relates more specifically to mobile inspection methods and systems for solar mirror soiling and heliostat performance.

Solar power towers are utilized to receive concentrated solar radiation to produce high-temperature thermal energy to generate utility-scale electricity or perform solar chemistry. To generate high thermal energy, solar power towers are located in large open areas (1-3 square miles) and include numerous heliostats that collect and concentrate solar energy onto a central collector, or receiver. A heliostat includes a plurality of mirrored facets on a common frame that has two axis drives, such that the heliostat can slowly move to reflect sunshine onto the receiver over the course of a day. Current solar power tower fields include hundreds to tens of thousands of heliostats. To obtain substantially optimal concentrated solar flux on the central collector from a heliostat, the individual mirrored facets are accurately canted and focused.

A heliostat collector field is the front-end of a solar power tower plant. Any negative performance of the heliostat collector field propagates through subsystems of the tower plant and may reduce energy production and financial revenues. An underperforming collector field may provide insufficient solar flux to the central receiver mounted on the tower. Reduced solar flux results in the central receiver operating below the design capacity rating. The tower plant may not produce the thermal energy required for thermal storage and to run the power block at optimum efficiency. The performance of a deployed collector field can be reduced by poor mirror quality, e.g., surface and shape, mirror canting errors, tracking errors, and soiling. Such sources for error may occur during installation and become further degraded over time. If left unattended, overall plant performance may be substantially reduced.

Operators have attempted to find or develop tools to assess and eliminate canting errors on heliostats efficiently and accurately. Examples of methods that have been used in the past to assess and correct such errors include inclinometers, photogrammetry, fringe reflection or deflectometry, camera look-back, and laser scanning or projection. There are disadvantages in existing methods. They may require manual, tedious measurements taken on each individual heliostat. In some instances, many targets must be applied to the surface of the heliostat, which becomes impractical for large heliostat fields. Calibrations can be complex to achieve accuracy for surface measurements. Some allow for only one facet to be measured and corrected at a time and depend on accurate angle control of the heliostat. Finally, scanning a full heliostat is inefficient and time consuming. Existing assessment and correction methods for heliostat fields do not allow for in-situ measurements on the heliostats.

Current methods to assess heliostat mirror soiling include: 1) a few representative facets measured with a hand-held reflectometer; or 2) by ad-hoc determination that energy production is noticeably reduced from its level of direct normal irradiance (DNI). The first is a time consuming process because multiple measurements on a facet are required for acceptable coverage, and the second relies on subjective judgement. Cleaning the mirrors may need to be performed frequently, increasing operation and maintenance costs.

There is a need for assessing and correcting errors in a heliostat solar-collector field to operate at or near optimal conditions, for greater efficiency and for enabling future integration and improvements to solar power tower plants.

There is also a need for fast and accurate canting assessment methods that may be preferably performed in-situ and used to correct errors in the heliostat field.

What is needed is a system and/or method that satisfies one or more of these needs or provides other advantageous features. Other features and advantages will be made apparent from the present specification. The teachings disclosed extend to those embodiments that fall within the scope of the claims, regardless of whether they accomplish one or more of the aforementioned needs.

SUMMARY OF THE INVENTION

One embodiment relates to an imaging system for inspecting a heliostat. The imaging system includes a platform and a camera mounted on the platform and a heliostat having a plurality of mirrored facets. The camera is positioned to acquire a first image that serves as a reference image and a second image that is a reflected image from at least one facet. The camera stores image data associated with the first image and the second image, and wirelessly transmits the stored image data to the a computing apparatus. The computing apparatus compares the first image with the second image and determines a performance parameter associated with the heliostat.

Another embodiment relates to a method for inspecting a heliostat includes mounting a camera on a platform; acquiring with the camera a first image comprising a reference image of an object; acquiring with the camera a second image comprising a reflected image of the object; storing the first image and the second image in a memory portion of the camera; transmitting the stored first image and the second image to a computing apparatus; comparing the first image with the second image; and determining a performance parameter associated with the heliostat.

Yet another embodiment relates to a computer-readable storage medium comprising instructions that, when executed by a processor, cause the processor to perform acts including receiving a first image and a second image acquired from a camera mounted on a platform; the first image comprising a reference image of an object and the second image comprising a reflected image of the object; storing the first image and the second image in a memory portion of a computing apparatus; comparing the first image with the second image; and determining a performance parameter associated with the heliostat.

Certain advantages of the embodiments described herein are the ability to assess and correct errors in a heliostat solar-collector field to operate at or near optimal conditions, for greater efficiency and for enabling future integration and improvements to solar power tower plants.

Another advantage is for fast and accurate canting assessment methods that may be preferably performed in-situ and used to correct errors in situ in a heliostat field.

Still other advantages include the use of a mobile platform for imaging and determining reflectance ratio and/or canting errors of a heliostat that can be corrected in situ while the heliostat field remains in production.

Alternative exemplary embodiments relate to other features and combinations of features as may be generally recited in the claims.

BRIEF DESCRIPTION OF THE DRAWINGS

The application will become more fully understood from the following detailed description, taken in conjunction with the accompanying figures, wherein like reference numerals refer to like elements, in which:

FIG. 3A shows operation of the embodiment of FIG. 2 in a fixed camera platform mode indicating theoretical locations of the target features to evaluate the canting quality of a heliostat.

FIG. 3B shows Beam quality improvements on two heliostats using the Heliostat Focusing and Canting EnhFancement Technique (HFACET) with beams projected onto the solar tower wall.

FIG. 4 shows an exemplary drone for use with Universal Field Assessment, Correction and Enhancement Tool (UFACET).

DETAILED DESCRIPTION OF THE INVENTION

Before turning to the figures which illustrate the exemplary embodiments in detail, it should be understood that the application is not limited to the details or methodology set forth in the following description or illustrated in the figures. It should also be understood that the phraseology and terminology employed herein is for the purpose of description only and should not be regarded as limiting.

Figure 1:
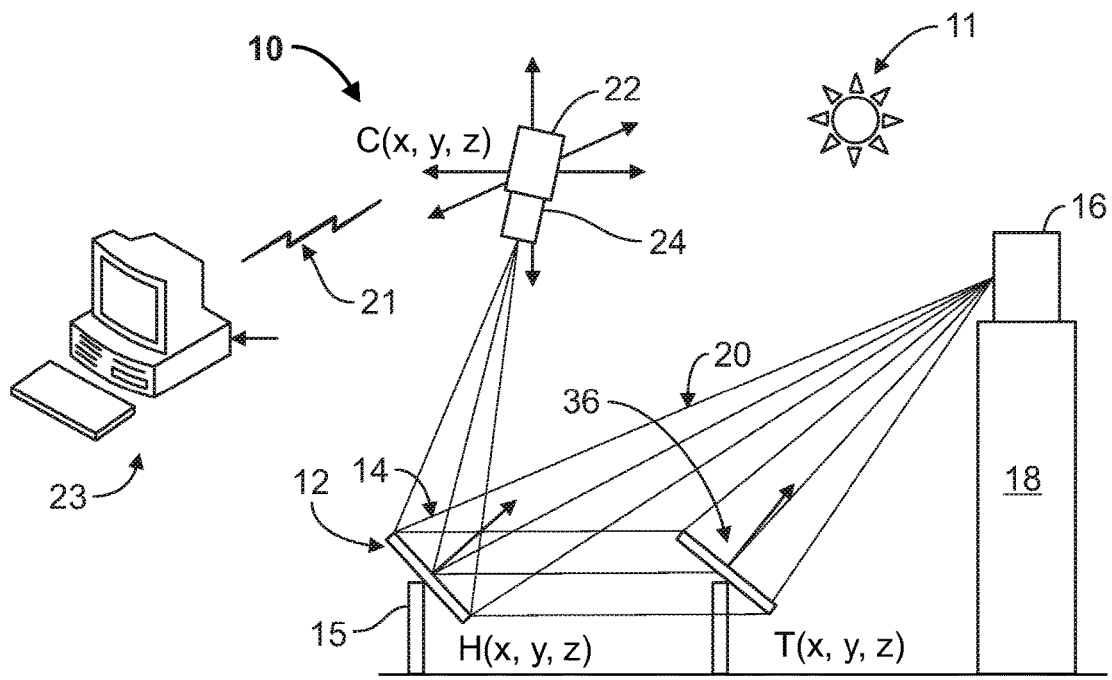
FIG. 1 shows an exemplary mobile imaging system of the present invention.

Referring to FIG. 1, a mobile imaging system 10 is arranged to inspect offline or in operation (in-situ) heliostats 12 in an array or field of multiple heliostats. A heliostat includes a plurality of mirrored facets and a frame 15 that supports the plurality of mirrored facets. The frame may be configured with two axis drives such that the heliostat 12 can track the movement of the sun 11 over the course of a day. The heliostat 12, in operation, is configured to reflect solar radiation received at the mirrored facets 14 towards a central receiver 16 on a solar power tower 18. Generally, hundreds or thousands of heliostats may be positioned proximate to a solar power tower 18 such that a significant amount of solar radiation, represented by lines 20, is concentrated on receiver 16 mounted atop solar power tower 18. Solar radiation 20 captured by receiver 16 heats a liquid and transforms the state of the liquid to a gas to drive a turbine, for example. The turbine (not shown) generates utility-grade electrical power. An unmanned aerial system or UAS 22, otherwise known as a drone, and an imaging system 24, such as, for example, a camera and lens, is transported by UAS 22. Images are generated by UAS 22 (see, e.g., FIGS. 3A and 3B). The data obtained by the images is analyzed to assess the performance parameters of the heliostat mirror facet related to canting and alignment. In one embodiment, the mobile imaging system displays the canting errors, which can then be corrected by receiving contemporaneous feedback data in the form of live video images while making the corrections. Camera 24 is in wireless data communication with computing apparatus 23 via data communication link 21.

Referring next to FIG. 4, a solid model of an exemplary UAS 22 drone with quick release payload and dampening system is shown. In the embodiment of FIG. 4, the span is about 1.8 m. Lateral position of UAS 22 while airborne can be determined to within +/−1 meter (m) using conventional GPS. Differential GPS improves the positional accuracy to about +/−10 centimeters (cm). By incorporating real-time kinematic (RTK) navigation, the lateral positional accuracy can further be improved to about +/−3 cm (~1 inch). In addition, LIDAR altimetry is used to significantly improve the estimated UAS altitude to within 1 to 2 cm. The positional determination methods on board UAS 22 may be combined with photogrammetry on ground-based targets (e.g., heliostats). Alternately, offboard methods such as computer vision techniques and interferometry may be employed to provide superior positioning of the UAS. Stability of UAS 22 during hovering maneuvers is important. UAS stabilization hardware and optical stabilization equipment (not shown) is incorporated for constancy during image collection.

In an exemplary embodiment, UAS 22 may be a Harris Aerial Model HX8 Drone with RTK capability, having an approximate payload up to 15 kilograms (kg) and a battery power source having 4×22,000 milliamp hours (mAH). Camera 24 may be a 4 k resolution camera with at least 10× zoom lens, CMOS optically stabilized. UAS 22 may be stabilized with a 3-axis brushless gyro gimbal. An HD Video Transmitter manufactured by Connex provides video resolution of 1080P at 60 frames per second via wireless transmission. Flight stability hardware may be, e.g., DJI Guidance for hovering accuracy to within 2 to 4 centimeters.

Figure 2:
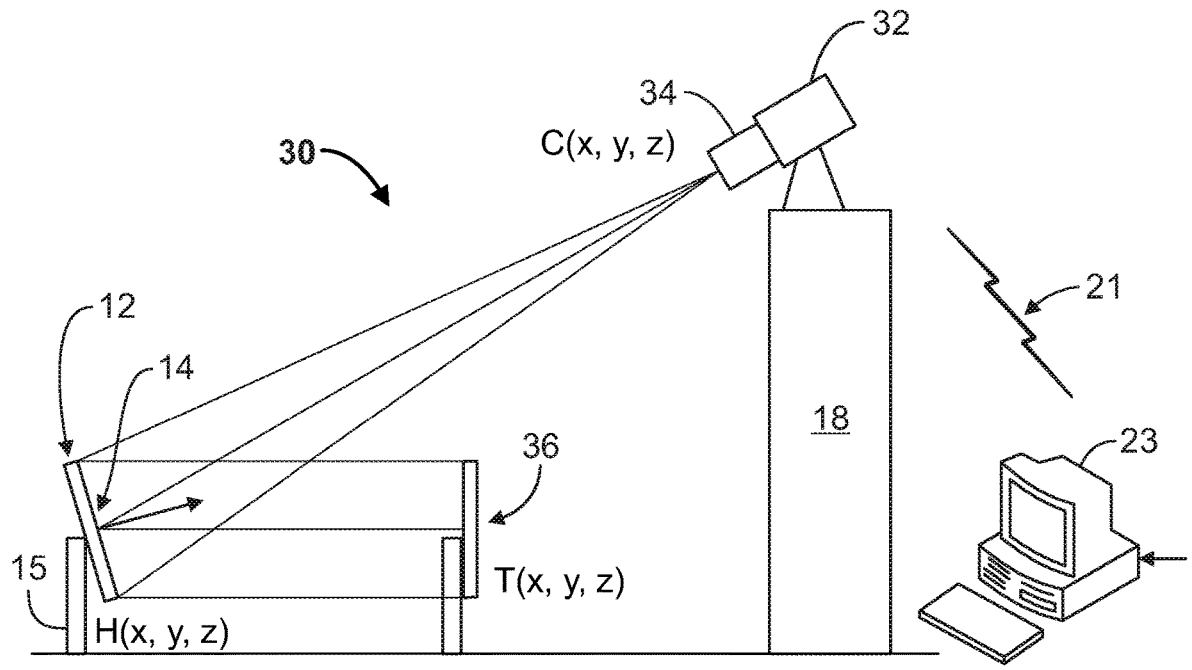
FIG. 2 shows an alternate exemplary embodiment mobile imaging system of the present invention.

Referring next to FIG. 2, a fixed platform system 30 is illustrated. In system 30, a digital camera 32 with a zoom lens 34 is placed atop tower 18. In other embodiments, other structures may be used that fix the camera 32 at a location in place of and/or in addition to the tower 18. Camera 32 is focused at heliostat 12 of interest. A target heliostat 36 is placed adjacent heliostat 12. To view target heliostat 36 both heliostat 12 and target heliostat 36 may be taken offline. An image of target heliostat 36 is captured in reflection through heliostat 12. Preferably target heliostat 36 is spaced at a reasonable distance from heliostat 12 that is not great enough to render the reflected image of the target structure 36 indistinguishable, as the heliostat mirrors or facets 14 are not optical quality, e.g., typically at about 1 mrad surface slope error. By recording the required heliostat shape in ideal focus, and target structure dimensions or locations of features, a theoretical target image, or reference image, is constructed virtually in software. The theoretical image of target heliostat 36 or a feature thereof, is then superimposed on the captured image of target heliostat 36. By comparing the virtual image with the captured image, the canting error associated with each facet 14 is determined. In another aspect, a live video feed with the theoretical image overlay also provides instant visual feedback for making facet canting corrections in-situ. In the embodiment of FIG. 2, the method depends on determining in advance the 3D coordinates of system 30 components, including camera 32, heliostat of interest 12, and target heliostat 36.

Referring next to FIG. 3A, operation of the heliostat focusing and canting enhancement technique as described above with respect to FIG. 2 is shown. FIG. 3 represents an image of the heliostat of interest and the backside of the target heliostat in reflection. Theoretically generated images of the crossmembers are overlaid. Fixed camera system 30 shown in FIG. 2 is employed in the embodiment of FIG. 3A. Marks 31 indicate theoretical locations of features on target heliostat 36. Marks 31 are ideally located at the intersection of cross brackets 33, or center 35 of facets 14. Off-center marks 31 indicate canting error and provide a guide for repositioning a respective facet 14 to an ideal position. FIG. 3B illustrates beam quality improvements on two heliostats, wherein the direct and indirect solar beams are projected onto a wall of the solar tower 18. The upper and lower images show a misaligned mirror facet and correctly canted mirror facet, respectively.

Referring next to FIGS. 4 through 8, in another embodiment, a method and system is shown for measuring mirror soiling of heliostat 12 using a mobile camera system 50. With the proper number of neutral density ND filters 52 attached to a camera lens 54, an image of the sun 70 (FIG. 7) may be recorded along with the direct normal irradiance, or DNI. The surface normal vector of the heliostat is indicated by arrow 74. UAS 22 is maneuvered, e.g., by tilting, and controlling the camera gimbal (not shown) to acquire a direct image 70 (FIG. 7) of sun 11 (see FIG. 6). Camera 24 is then directed at heliostat 12 to acquire reflected sun image 80 (FIG. 8) as reflected from facet 14. The distance between UAS 22 to heliostat 12 must be sufficiently proximate to minimize mirror shape and slope errors which may degrade the sun images. In an embodiment, shape and slope errors may be estimated using image processing. The ratio of the intensity determined from the direct sun image 70 with the reflected sun image 80 provide a measure of the mirror reflectance magnitude, ρ, as indicated in Equation 1 below. Comparing historical data from previous measurements provides reflectance degradation due to soiling. Reflectance degradation may be used to develop field cleaning schedules to help reduce operation and maintenance costs with improved efficiency.

Figure 5:
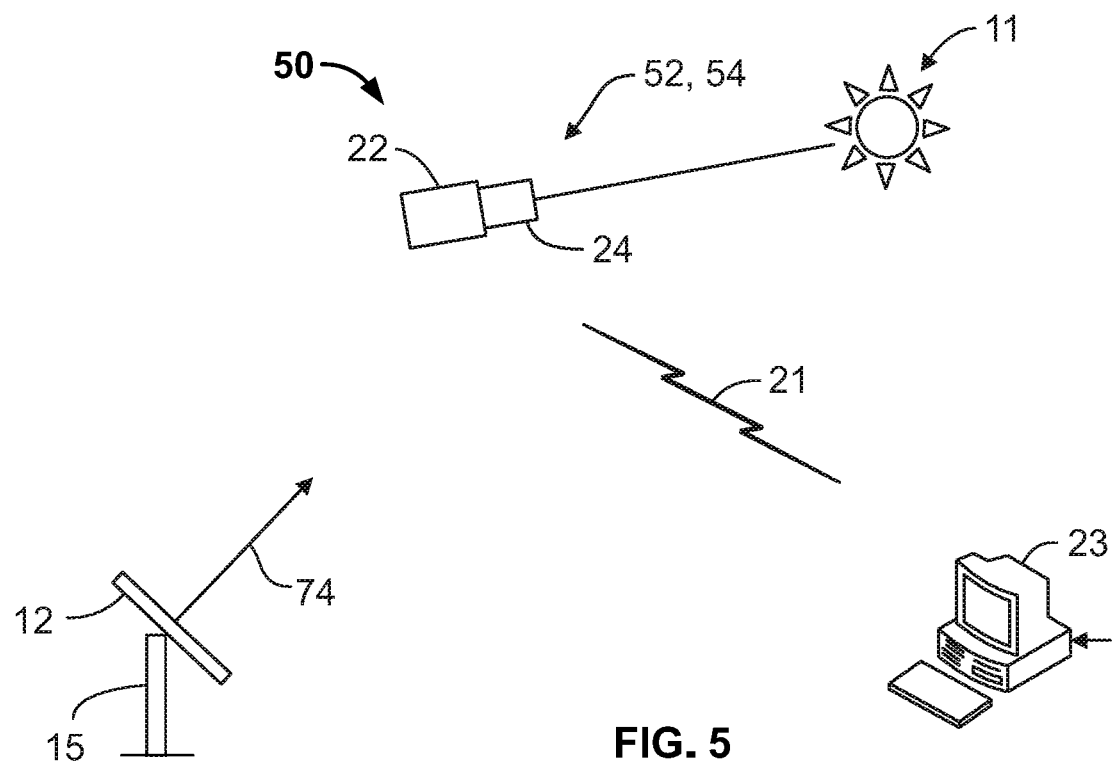
FIG. 5 shows an alternate embodiment incorporating the drone of FIG. 4 with a camera on the mobile platform directed at the sun.
Figure 6:
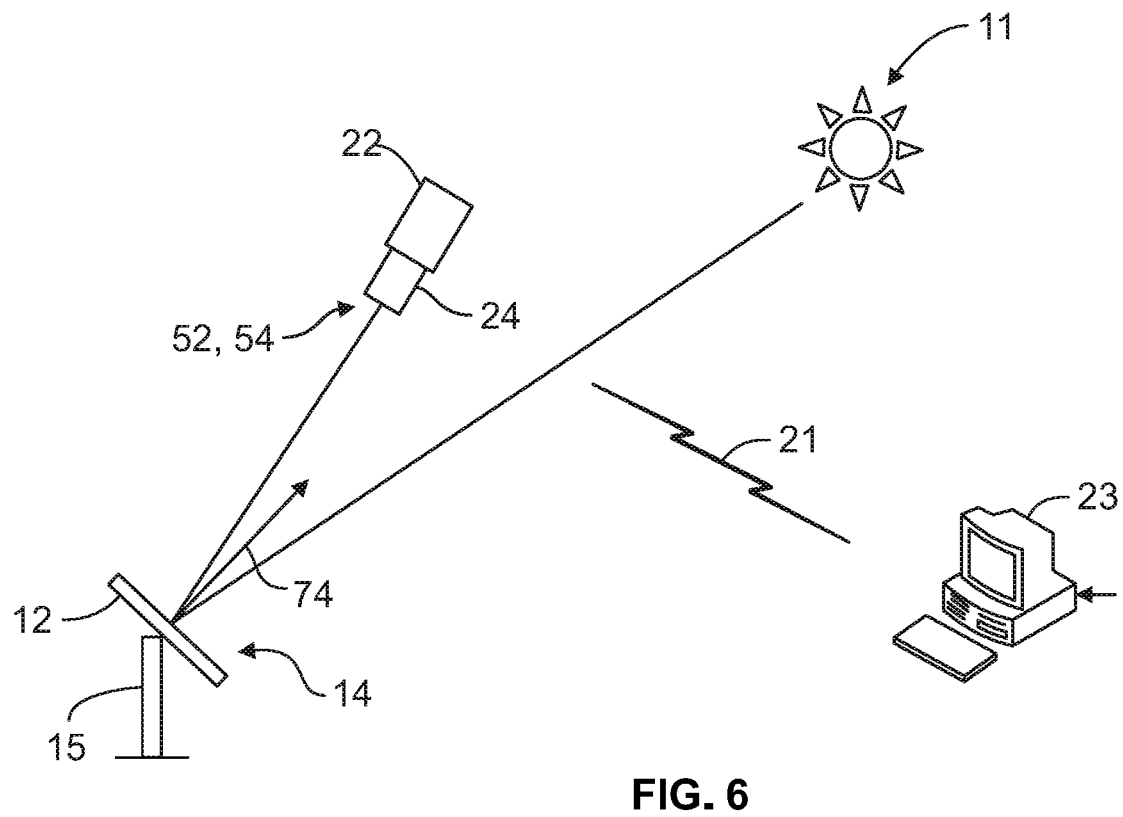
FIG. 6 shows the camera of FIG. 5 directed at the heliostat to image a reflection of the sun through a heliostat facet.

FIGS. 5 and 6 show an exemplary arrangement of the system and method for in-situ heliostat mirror soiling measurements. Referring to FIG. 5, camera 24 is directed towards the sun 11 for image calibration. Next, as shown in FIG. 6, camera 24 is directed at heliostat 12 and facet 14 which reflects an image 80 of the sun 11. Reflected image 80 from heliostat facet 14 provides an estimate of the reflectance magnitude, ρ associated with facet 14.

Given a first image 70 of the sun 11 acquired directly and having an intensity $I_{direct}$ and a second image 80 of the sun 11 in reflection through facet 14 having an intensity $I_{reflected}$, the reflectance can be estimated by summing the pixel intensities for reflected image 80, indicated as $I_{reflected}$ and for the direct image 70 indicated as $I_{direct}$, and computing the reflectance ratio ρ according to equation 1 below:

$$\rho = \sum I_{reflected} / \sum I_{direct} \quad \text{Eq. 1}$$

Figure 7:
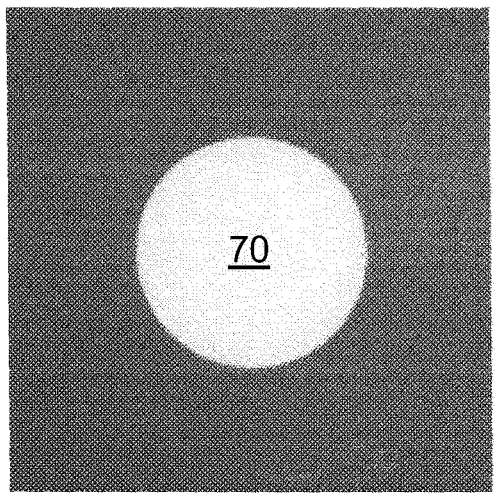
FIG. 7 shows the direct solar image captured by UFACET according to FIG. 5.
Figure 8:
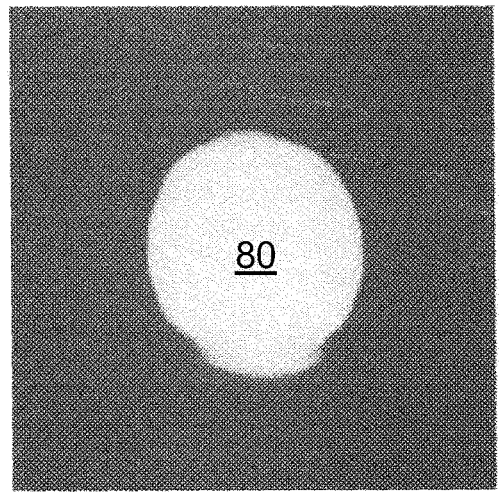
FIG. 8 shows the reflected solar image captured by UFACET according to FIG. 6.

FIG. 7 shows a direct image 70 of the sun acquired via camera 24, and FIG. 8 shows a reflected image of the sun 80. For two images 70, 80, the estimated reflectance ratio ρ is computed to be 0.851 using Equation 1 above. The angle of incidence for the reflected image 80 was 15-20°. The angle of incidence may be determined by photogrammetry and GPS coordinates for camera 24. Measurements taken using a reflectometer on facet 14 indicated a reflectance of 0.805, a deviation from the estimate using an image processing method by 0.046 or 5.7%. The primary variation between the two measurements taken with different instruments is the acceptance angle. For the reflectometer, the acceptance angle is typically set to 15 milli-radians, resulting in the smaller reflectance measurement value. For the camera images in FIGS. 7 and 8, the acceptance angle is slightly larger at about 25 milli-radians.

The acceptance angle of the imaging system can be set by adjusting the zoom on camera lens 54, or by image processing of the images, cropping the images. If the zoom setting on lens 54 is insufficient to reduce the acceptance angle, image processing can crop the images to a size associated with a predetermined acceptance angle.

Figure 9:
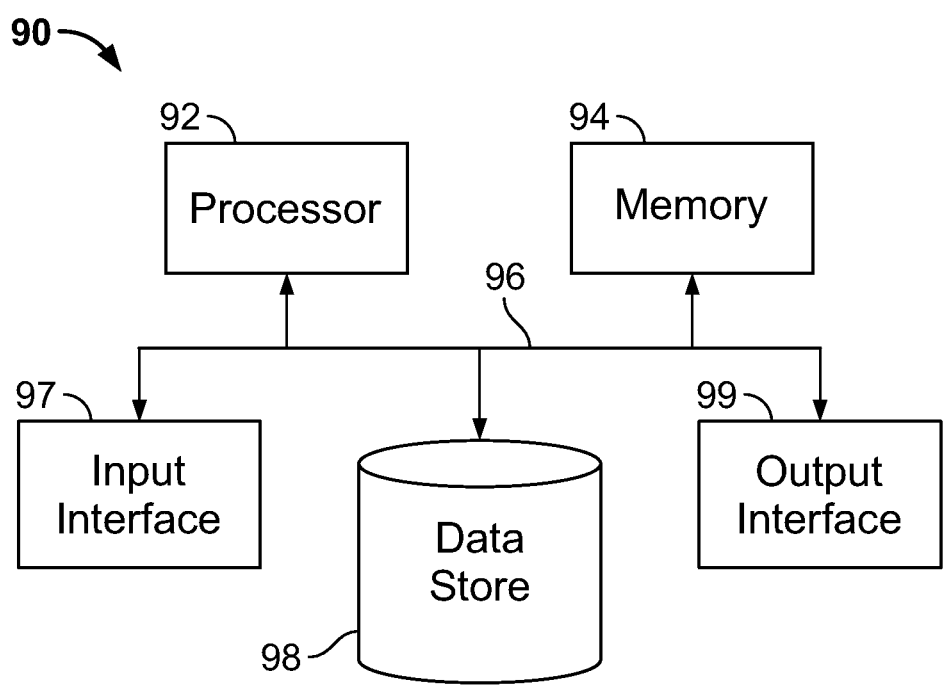
FIG. 9 is a high-level illustration of an exemplary computing device for receiving and processing images and data associated with the invention.

Referring to FIG. 9, an illustration of an exemplary computing device 90 that can be used in accordance with the systems and methodologies disclosed herein is illustrated. For instance, the computing device 90 may be used in a system that supports imaging data and positioning data associated with mirrored facets of heliostats. In another example, at least a portion of the computing device 90 may be used in a system that supports generating an image of a reflected target or solar image via mirrored facets of a heliostat. The computing device 90 includes at least one processor 92 that executes instructions that are stored in a memory 94. The memory 94 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 92 may access the memory 94 by way of a system bus 96. In addition to storing executable instructions, the memory 94 may also store images, data indicative of orientation of heliostats and/or targets, data indicative of distance between heliostats and targets, etc.

The computing device 90 additionally includes a data store 98 that is accessible by the processor 92 by way of the system bus 96. The data store 98 may be or include any suitable computer-readable storage, including a hard disk, memory, etc. The data store 98 may include executable instructions, data indicative of distances between heliostats and targets, etc. The computing device 90 also includes an input interface 97 that allows external devices to communicate with the computing device 90. For instance, the input interface 97 may be used to receive instructions from an external computer device in a wireless manner, etc. The computing device 90 also includes an output interface 99 that interfaces the computing device 90 with one or more external devices. For example, the computing device 90 may display text, images, etc., by way of the output interface 99. Additionally, the computing device 90 may transmit signals wirelessly by way of the output interface 99.

Additionally, while illustrated as a single system, it is to be understood that the computing device 90 may be a distributed system. Thus, for instance, several devices may be in communication by way of a network connection and may collectively perform tasks described as being performed by the computing device 90.

While the exemplary embodiments illustrated in the figures and described herein are presently preferred, these embodiments are offered by way of example only. Accordingly, the present application is not limited to a particular embodiment but extends to various modifications that nevertheless fall within the scope of the appended claims. The order or sequence of any processes or method steps may be varied or re-sequenced according to alternative embodiments.

The present application contemplates methods, systems and program products on any machine-readable media for accomplishing its operations. The embodiments of the present application may be implemented using an existing computer processor, or by a special purpose computer processor for an appropriate system, incorporated for this or another purpose or by a hardwired system.

It is important to note that the construction and arrangement of the mobile platform inspection system and methods as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

As noted above, embodiments within the scope of the present application include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the figures herein may show a specific order of method steps, it is understood that the order of these steps may differ from what is depicted. Also, two or more steps may be performed concurrently or with partial concurrence. Such variation will depend on the software and hardware systems chosen and on designer choice. It is understood that all such variations are within the scope of the application. Likewise, software implementations could be accomplished with standard programming techniques with rule based logic and other logic to accomplish the various connection steps, processing steps, comparison steps and decision steps.

The invention claimed is:

1. An imaging system for inspecting a heliostat, comprising:
    a platform and a camera mounted on the platform; a heliostat comprising a plurality of mirrored facets;
    the camera positioned to acquire a first image comprising a reference image; and a second image comprising a reflected image captured from at least one facet of the plurality of facets; and a computing apparatus;
    the camera configured to store image data associated with the first image and the second image, and to wirelessly transmit the stored image data to the computing apparatus; and
    the computing apparatus configured to compare the first image with the second image and determine a performance parameter associated with the heliostat;
    wherein the performance parameter is one of a facet position or a facet reflectance ratio; and
    wherein the first image is an image of the sun directly acquired by the camera; and the reflectance ratio being determined based on the first image having an intensity $I_{direct}$; and the second image is a reflected image having an intensity $I_{reflected}$; the reflectance estimated by summing intensities for the second image and for the direct image and computing the reflectance ratio ρ, wherein ρ is defined as:

$$\rho = \sum I_{reflected} / \sum I_{direct}.$$

2. The imaging system of claim 1, wherein the first image is a target heliostat that is disposed facing the plurality of mirrored facets.

3. The imaging system of claim 1, wherein the platform comprises a mobile platform, the mobile platform comprising an unmanned aerial system, the mobile platform having position coordinates relative to the heliostat, the position coordinates providing an angular reference for determining a reflectance ratio or a facet position.

4. The imaging system of claim 3, wherein the mobile platform comprises a drone.

5. The imaging system of claim 1, wherein the platform is a stationary platform mounted on a tower; the stationary platform having fixed position coordinates relative to the heliostat.

6. The imaging system of claim 1, wherein an angle of incidence of the camera with respect to the second image is determined by photogrammetry using a direct normal irradiance parameter and global positioning system coordinates associated with a position of the camera.

7. A method for inspecting a heliostat comprising:
mounting a camera on a platform;
acquiring with the camera a first image comprising a reference image of an object;
acquiring with the camera a second image comprising a reflected image of the object;
storing the first image and the second image in a memory portion of the camera;
transmitting the stored first image and the second image to a computing apparatus;
comparing the first image with the second image; and
determining a performance parameter associated with the heliostat;
further comprising providing a stationary tower for mounting the platform; and providing fixed position coordinates of the camera relative to the object and to the first heliostat relative to the object; and determining a reflectance ratio or a facet position based on an angular reference derived from the respective position coordinates.

8. The method of claim 7, wherein the object is a first heliostat.

9. The method of claim 8, wherein acquiring the first image comprises targeting a second heliostat that is disposed facing the plurality of mirrored facets associated with the first heliostat.

10. The imaging system of claim 8, wherein the first image is a an image of the sun directly acquired by the camera; and further comprising determining a reflectance ratio based on the first image having an intensity $I_{direct}$, and the second image having an intensity $I_{reflected}$; and estimated the reflectance ratio by summing a plurality of intensity values for the second image and for the first image;
and computing the reflectance ratio ρ, wherein ρ is defined as:

$$\rho = \sum I_{reflected} / \sum I_{direct}.$$

11. The method of claim 10, further comprising making facet canting corrections in-situ on the heliostat.

12. The method of claim 11, further comprising determining in advance the 3D coordinates of the camera, the object, and the heliostat.

13. The method of claim 7, wherein determining the performance parameter comprises determining a facet position or a facet reflectance ratio.

14. A computer-readable storage medium comprising instructions that, when executed by a processor, cause the processor to perform acts comprising:
receiving a first image and a second image acquired from a camera mounted on a platform; the first image comprising a reference image of an object and the second image comprising a reflected image of the object; storing the first image and the second image in a memory portion of a computing apparatus;
comparing the first image with the second image; and
determining a performance parameter associated with the heliostat; wherein the first image comprises an image of a target heliostat in an ideal camera focus, the first image being superimposed on the second image; and the computing apparatus configured to generate a canting error associated with each facet of the plurality of facets based on the superimposed first and second image.

15. An imaging system for inspecting a heliostat, comprising
a platform and a camera mounted on the platform; a heliostat comprising a plurality of mirror facets;
the camera positioned to acquire a first image comprising a reference image and a second image comprising a reflected image captured form at least one facet of the plurality of facets; and a computing apparatus;
the camera configured to store image data associated with the first image and the second image, and to wirelessly transmit the stored image data to the computing apparatus;
the computing apparatus configured to compare the first image with the second image and determine a performance parameter associated with the heliostat;
wherein the first image comprises an image of a target heliostat in an ideal camera focus, the first image being superimposed on the second image; and the computing apparatus configured to generate a canting error associated with each facet of the plurality of facets based on the superimposed first and second image.

16. The imaging system of claim 15, further comprising a live video feed generated through the computing apparatus configured to generate an instant feedback image of the canting error.

17. A method for inspecting a heliostat comprising:
mounting a camera on a platform;
acquiring with the camera a first image comprising a reference image of an object;
acquiring with the camera a second image comprising a reflected image of the object;
storing the first image and the second image in a memory portion of the camera;
transmitting the stored first image and the second image to a computing apparatus;
comparing the first image with the second image; and
determining a performance parameter associated with the heliostat; further comprising providing a mobile unmanned aerial system for the platform; and transmitting position coordinates of the mobile unmanned aerial system relative to a position of the heliostat and determining the performance parameter based on an angular reference derived from the respective position coordinates.

\* \* \* \* \*